Patented May 27, 1952

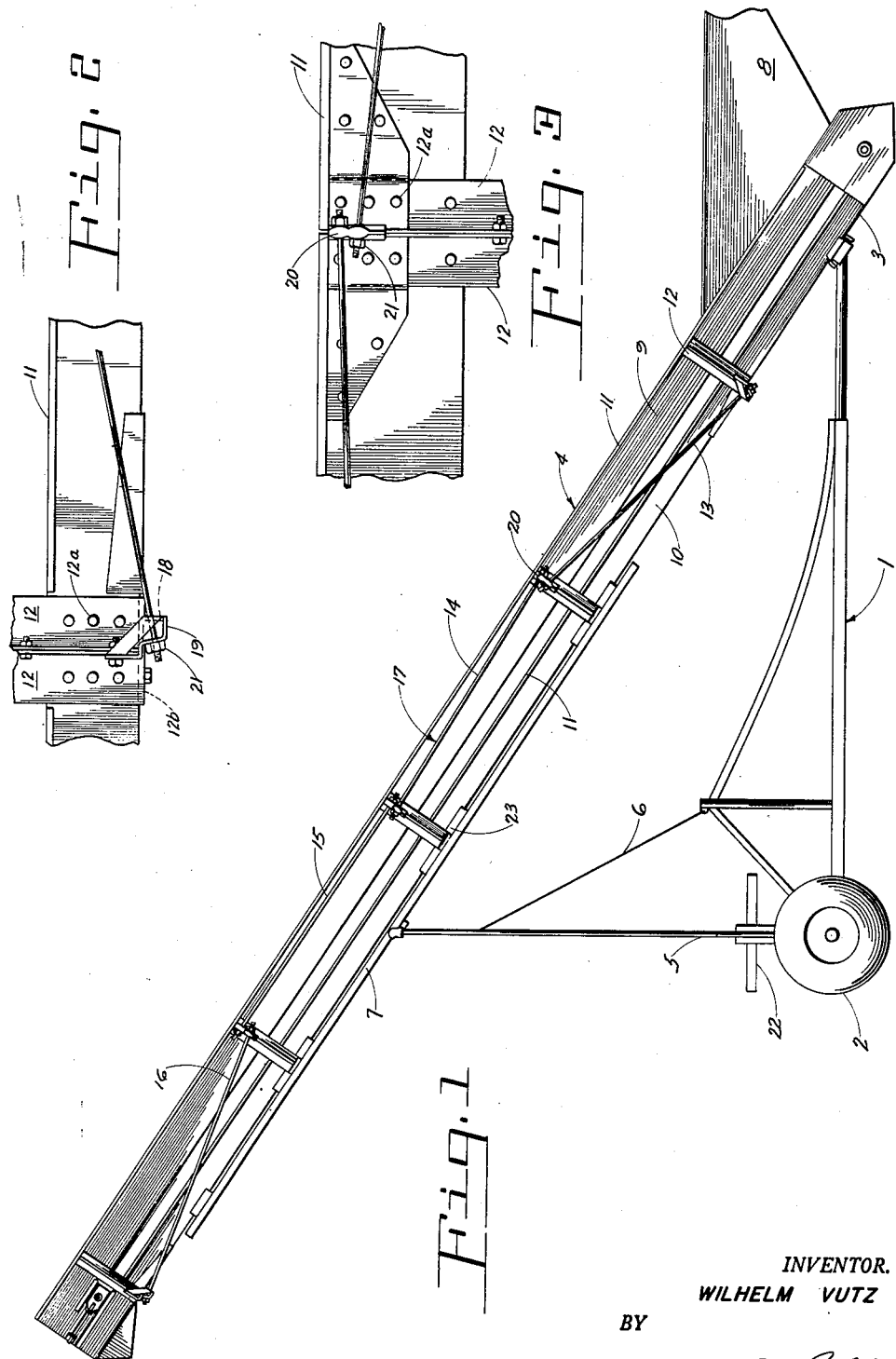

2,598,470

UNITED STATES PATENT OFFICE 2,598,470

ELEVATOR HAVING REINFORCING TRUSS RODS

Wilhelm Vutz, Coldwater, Ohio, assignor to Avco Manufacturing Corporation, Cincinnati, Ohio, a corporation of Delaware Application August 22, 1950, Serial No. 180,850

5 Claims. (Cl. 198—233)

The present invention relates to an elevator construction, more particularly an improved arrangement of reinforcing truss rods for strengthening the conveyor section of a portable elevator.

The conveyors of portable agricultural elevators usually are built in sections so that the conveyors can be lengthened as necessary to meet current requirements or particular applications. A standard type of conveyor for such an elevator includes an upper and a lower trough, each made of light gage sheet metal formed into a shallow U-shaped cross section. The lengths of the sections which are joined to make the conveyor may vary and usually are from 8 to 10 feet in length. The upper and lower troughs are joined and supported in parallel relation by transverse rigid supporting members.

It is common practice to construct elevator conveyors by riveting the ends of the troughs of which the sections are made to transverse pieces of angle iron, the angle irons of the adjacent sections being bolted together to complete the conveyor. Of necessity, the efficiency of such a riveted connection between the trough and its associated angle iron is less than 100% or, in other words, when under stress, the riveted joint fails before the material of the trough fractures. Because of the weakness of these riveted joints, it is necessary to provide some form of reinforcement. A typical reinforcing arrangement used in the past included a series of rods arranged diagonally in pairs across each lateral face of each conveyor section, thereby forming a series of similar X patterns along both sides of the conveyor.

In such an arrangement of rods, it is necessary to provide four reinforcing rods and eight associated anchor fittings at the ends of the rods for each separate section of the conveyor. It is an object of the present invention therefore to reduce the number of reinforcing rods required and to rearrange them so that two rods with four anchor fittings reinforce the conveyor as effectively as done previously by the increased number of parts.

It is also an object of the invention to provide a reinforcing structure for portable elevators which reduces the weight of the completed conveyor assembly and makes possible a substantial economy in manufacturing such units.

As will be described more fully hereinafter, the reinforcing truss rods of the present invention are disposed in positions favorable to the type of loads encountered. It is therefore an advantage of the present invention that the total load carried by each truss rod is reduced whereby the stress to which it is subjected is materially reduced in comparison to that of the previously used reinforcing rods.

A further object of the present invention is to simplify the assembly procedure for an elevator conveyor whereby both time and money may be saved in its construction.

A still further advantage of the present invention is that it makes possible the straightening of warped conveyors. The sheet metal conveyor structure is inherently very elastic and for this reason it is difficult to manufacture the elevator sections with absolute accuracy insuring perfect straightness. The truss rods of the present invention can be individually adjusted to impose stresses as required on the assembled conveyor in order to straighten it out should minor inaccuracies occur during fabrication.

The novel features that are considered characteristic of the invention are set forth in the appended claims; the invention itself, however, together with additional objects and advantages thereof, will best be understood from the following description of a specific embodiment when read in conjunction with the accompanying drawings, in which:

Fig. 1 shows a side elevational view of a portable agricultural elevator to which truss rods have been applied for strengthening purposes in accordance with the teachings of the present invention;

Fig. 2 shows in elevation a portion of the lower conveyor trough with one end of an associated truss rod anchored thereto; and Fig. 3 shows in elevation a portion of the upper conveyor trough where the ends of a pair of truss rods meet and are secured to the conveyor.

With particular reference to Fig. 1, it will be noted that the elevator with which the present invention cooperates comprises a transportable truck, generally designated 1, which has rotatably secured to one end thereof ground wheels 2 and which is pivotally secured at its opposite end to the lower or boot end 3 of an elevator conveyor, generally designated 4. A movable boom 5 is pivotally secured to truck 1 adjacent the ground wheels and can be moved arcuately about its pivotal attachment by adjustment of a flexible cable 6 which may be taken up or slackened by a winch (not shown) secured to the truck. The upper portion of the conveyor rests on the upper end of the boom which is swung arcuately to raise and lower the conveyor and guides along tracks 7 secured beneath the conveyor. Tracks 7 aid in strengthening the conveyor as will be described more fully hereinafter.

It is noteworthy that the boot end of the elevator rests on the ground and may be provided with a hopper 8 to which materials to be elevated may be supplied. The conveyor chains and flights have not been shown since they do not concern the present invention and may be of any standard construction adapted for the purpose. It is sufficient to understand that the conveyor chains are endless and are disposed for movement within an upper trough 9 and a lower trough 10 of the conveyor whereby materials supplied to hopper 8 can be advanced upwardly within trough 9, the conveyor chains returning to the hopper inside of the trough 10.

Troughs 9 and 10 may be made of light weight sheet metal or similar material and are formed to define a shallow U-shaped cross section. The top edges of the troughs are beaded or rolled over as indicated at 11 to produce additional strength and to prevent cracking through the upstanding sides of the troughs.

For a number of reasons it is desirable to construct the conveyor from a number of individual sections. As indicated in Fig. 1, each section is bounded at its ends by a pair of transverse strengthening members, such as angle irons indicated at 12, and includes in between a short length of troughs 9 and 10. Such a construction facilitates manufacture and shipment of the elevator and makes it possible to increase the length of the conveyor to meet particular requirements merely by the addition of extra sections. Thus, using conveyor sections ranging from 8 to 10 feet in length, it is possible to construct conveyors ranging from 26 to 50 feet in length having a delivery height ranging up to 28 feet above the ground level. The ability to thus increase the length of a conveyor is of great advantage to a farmer who has varied requirements at different times of the year and who usually cannot afford to buy or keep on hand conveyors of various length.

Another important factor to be considered in the construction of an elevator is that it must be fabricated from light weight materials in order to facilitate transportability and elevational adjustment of the unit. It is for this reason that the troughs are made of relatively light weight metal. These light weight materials, plus the fact that the conveyor is built in sections, create a strength problem which must be effectively coped with if the elevator is to operate satisfactorily.

When it is appreciated that an elevator is commonly employed to convey bales ranging up to 80 pounds in weight, it will be understood that the conveyor must be substantially built. This is accentuated by the fact that the conveyor during use has only two points of support, namely, the ground at its lower end and an intermediate point determined by the position of the boom 5. For this reason, the conveyor, considered as a whole, must have considerable beam strength so that the overhanging portion beyond the boom will not deflect objectionably when the conveyor is heavily loaded. Furthermore, it has been found in practice that although a trough per se can withstand the loads encountered, the rivets by which it is joined to angle irons 12 constitute points of weakness which must be reinforced.

As has been described hereinbefore, the strength problems presented have been solved in the past by the provision of diagonally disposed reinforcing rods provided on each side of each conveyor section. From a functional standpoint, this construction has been satisfactory, however, it is wasteful of material and subjects the diagonally disposed rods to abnormally large stresses which can be avoided by use of the present invention.

An elevator assembly employing truss rods positioned according to the present invention approaches a constant strength beam in its strength characteristics. In other words, the moment of inertia of the conveyor cross section varies more or less in proportion to the moment to which the conveyor is subjected. This is accomplished by providing truss rods, generally indicated 17, along both side faces of the conveyor. One truss rod 13 is disposed diagonally across the second section of the conveyor, the section resting on the ground being considered the first. The next truss rod 14 is disposed approximately parallel to the length of the conveyor near the top edge of the third elevator section. Another truss rod 15 is similarly disposed near the top edge of the fourth conveyor section. Truss rod 16 is diagonally positioned across the side of the fifth and last conveyor section. The opposite side of the conveyor has a similarly disposed set of truss rods.

As shown particularly well in Figs. 2 and 3, each conveyor section is provided at its ends with transverse pieces of angle iron 12 which space apart and support the associated trough sections riveted thereto as indicated at 12a. The angle irons of the adjacent sections are joined together by bolts or similar fasteners to create the composite assembled conveyor. Plates 12b are also bolted to the bottom surfaces of the conveyor troughs to increase the strength of the joints between the sections. Thereafter, the truss rods are assembled to the opposite side faces of the conveyor.

As shown in Fig. 2 the lower ends of the diagonal truss rods are passed through an angle iron 18 which is positioned beneath the lower trough for strengthening purposes. Thereafter the truss rod is passed through an anchor bracket 19 which is welded to angle iron 18.

As indicated in Fig. 3, an anchor bracket 20 is secured to the upper ends of adjacent angle irons 12. These anchor brackets aid in holding the angle irons together and also serve to hold the ends of a pair of truss rods which pass through the brackets.

It will be noted that the truss rods are merely threaded at their ends and are secured in position to the various brackets by nuts 21 at each end of each truss rod.

A study of the truss rod arrangement shown in Fig. 1 will reveal that each diagonal truss rod, such as 13 and 16, is passed through the lower part of the anchor bracket 20 with which it is associated, whereas truss rod 14 passes from the upper portion of one anchor bracket to the lower portion of the other anchor bracket which holds it. Truss rod 15 in turn passes through the upper portions of both of the anchor brackets with which it is associated.

When the assembled conveyor with truss rods is considered as a beam which is loaded either at a number of spaced points or uniformly, it will be noted that in the region on either side of boom 5 the lower trough 10 and tracks 7 are subjected to compressive loads whereas the upper trough tends to carry tension loads which are transferred to the truss rods. Thus, in the third and fourth conveyor sections where these tension loads would be relatively large, the truss rods 14 and 15 are relatively far removed from the neutral axis of the conveyor assembly. Further, they are placed in a position favorable for carrying the tension loads involved and prevent trough 9 and its associated riveted joints, from being placed in tension. It has been found in practice that any tendency for the riveted joints to fail is avoided by the use of truss rods as described.

In those sections of the elevator which are subjected to relatively small bending moments, such as the second and fifth sections, the truss rods 13 and 16 are disposed diagonally thereby gradually reducing the moment of inertia of the conveyor cross section approximately in proportion to the decrease of the bending moment to which the conveyor is subjected.

It should be noted that truss rods 14 and 15 are excellently positioned for carrying the tension loads encountered. It should also be noted that if these rods were disposed diagonally in this region, they would have to carry greater loads and thus would be subjected to higher unit stresses, because only that component of the total load carried which is parallel to the axis of the conveyor would be effective in relieving the upper trough from tension stresses.

Since the truss rods provided by the present invention are favorably disposed along the sides of the conveyor, it is possible to reduce the number employed to merely two truss rods per elevator section. When it is remembered that the conventional construction now employs four truss rods per section, two diagonally disposed along each face of each section, it will be obvious that two truss rods and their associated fittings have been eliminated for each conveyor section. This naturally results in a very desirable saving of material, weight and cost, all of which are highly important in the manufacture of an elevator. In addition, smaller diameter rods may be employed for a given size conveyor.

It will be noted that the truss rods are effective regardless of the number of sections employed in the conveyor. For instance, if another section were inserted between the third and fourth sections of the conveyor shown in Fig. 1, an additional truss rod would also be provided at each side running parallel to the top edge of the section in a manner similar to truss rod 14.

When the elevator is to be conveyed from one location to another, boom 5 is swung to a more or less horizontal position thereby lowering the conveyor correspondingly until it comes to rest on a pair of horizontal saddles 22, which are rigidly secured to truck 1. It is considered desirable that cable 6 be kept under a slight tension when the conveyor is lowered so that it will receive support from the end of the boom as well as from the saddle. Even with cable 6 slightly tensioned, it has been found that the saddle tends to take the major portion of the weight of the conveyor, thereby subjecting the conveyor to a beam type loading resembling that of a beam simply supported at a single point at its center.

In other words the main weight of the conveyor tends to be carried by the saddle alone with the lower trough sections in compression and the top trough sections in tension. It will be obvious that in this condition the truss rods again are very beneficial in eliminating objectionable stress conditions in the riveted joints between the sections. Tracks 7 act as strengthening members to carry any loads to which the lower trough sections are subjected. Thus the tracks function beneficially not only in providing bearing surfaces for the end of boom 5 but also in strengthening the conveyor assembly without significantly increasing its weight. In the preferred embodiment the tracks are secured to gusset plates 23 which are bolted to members 12.

Although the present invention has primary utility when used with a conveyor built in sections, it is obvious that truss rods of the type disclosed could be applied advantageously to a conveyor built from one piece troughs held in spaced parallel relationship by a plurality of transverse members similar to members 12. The truss rods would be of particular use in this type of conveyor in eliminating sagging and correcting warpage incidental to fabrication of the conveyor.

Having described a preferred embodiment of my invention, I claim:

1. In combination in a portable agricultural elevator, a portable truck, an inclined conveyor pivotally secured near its lower end to one end of said truck, a boom for adjustably supporting said conveyor, said boom being pivotally secured to said truck at its end opposite its attachment to said conveyor, said boom bearing against the underside of said conveyor in supporting relationship therewith, said conveyor comprising a plurality of detachable sections each comprising upper and lower trough members held in parallel spaced relationship by integrally secured transverse supporting members located at the ends of said trough members, said transverse members at the ends of adjacent sections of said conveyor being releasably secured together, anchor fittings secured to said transverse members adjacent the top edge of the assembled conveyor remote from the point of bearing support of said boom, a plurality of truss rods adjustably secured to said anchor fittings and extending along each lateral face of said conveyor substantially parallel with its top edge, additional truss rods diagonally disposed between the end anchor fittings and the bottom edge of said conveyor, all of said truss rods being disposed substantially within the depth of the assembled conveyor.

2. In combination in a portable agricultural elevator, a portable truck, an inclined conveyor pivotally secured near its lower end to one end of said truck, means secured near the other end of said truck for adjustably supporting said conveyor, said means engaging the underside of said conveyor in supporting relationship therewith, said conveyor comprising a plurality of detachable sections each comprising upper and lower trough members held in parallel spaced relationship by integrally secured transverse supporting members located at the ends of said trough members, said transverse members at the ends of adjacent sections of said conveyor being releasably secured together, anchor fittings secured to said transverse members adjacent the top edge of the assembled conveyor, a plurality of truss rods adjustably secured to said anchor fittings and extending along each lateral face of said conveyor substantially parallel with its top edge, additional truss rods diagonally disposed between the end anchor fittings and the bottom edge of said conveyor, all of said truss rods being disposed substantially within the depth of the assembled conveyor.

3. The combination set forth in claim 2 wherein the means for adjustably supporting said conveyor is pivotally secured near the other end of said truck.

4. The combination set forth in claim 2 wherein the means secured near the other end of said truck for adjustably supporting said conveyor engages the underside of said conveyor along a single transverse line in supporting relationship therewith.

5. The combination set forth in claim 2, including elongated support tracks secured to the underside of said conveyor and wherein said means secured near the other end of said truck for adjustably supporting said conveyor engages said elongated support tracks in supporting relationship therewith.

WILHELM VUTZ.

REFERENCES CITED

The following references are of record in the file of this patent:

UNITED STATES PATENTS

| Number | Name | Date |
|---|---|---|
| 330,268 | Sprague | Nov. 10, 1885 |
| 425,552 | Schenck | Apr. 15, 1890 |
| 977,518 | Feldt | Dec. 6, 1910 |
| 1,212,617 | Flowers | Jan. 16, 1917 |
| 1,355,308 | Brown | Oct. 12, 1920 |
| 1,775,021 | Dolan | Sept. 2, 1930 |
| 2,387,189 | Steinmetz | Oct. 16, 1945 |